US009473866B2

(12) United States Patent
Bradley et al.

(10) Patent No.: US 9,473,866 B2
(45) Date of Patent: Oct. 18, 2016

(54) SYSTEM AND METHOD FOR TRACKING SOUND PITCH ACROSS AN AUDIO SIGNAL USING HARMONIC ENVELOPE

(71) Applicant: THE INTELLISIS CORPORATION, San Diego, CA (US)

(72) Inventors: David C. Bradley, La Jolla, CA (US); Rodney Gateau, San Diego, CA (US); Daniel S. Goldin, Malibu, CA (US); Robert N. Hilton, San Diego, CA (US); Nicholas K. Fisher, San Diego, CA (US)

(73) Assignee: KnuEdge Incorporated, San Diego, CA (US)

( * ) Notice: Subject to any disclaimer, the term of this patent is extended or adjusted under 35 U.S.C. 154(b) by 0 days.

(21) Appl. No.: 14/089,729

(22) Filed: Nov. 25, 2013

(65) Prior Publication Data

US 2014/0086420 A1 Mar. 27, 2014

Related U.S. Application Data

(63) Continuation of application No. 13/205,521, filed on Aug. 8, 2011, now Pat. No. 8,602,646.

(51) Int. Cl.
*G06F 15/00* (2006.01)
*G10L 25/00* (2013.01)
(Continued)

(52) U.S. Cl.
CPC ............... *H04R 29/00* (2013.01); *G10L 25/90* (2013.01); *G10L 2025/906* (2013.01)

(58) Field of Classification Search
CPC H05K 999/99; H04B 1/665; G11C 2207/16; G10L 19/0212; G10L 19/10; G10L 19/12; G10L 19/008; G10L 19/00; G10L 25/90; G10L 21/04
USPC ..................... 704/200, 200.1, 201, 203–207, 704/216–223, 500–504
See application file for complete search history.

(56) References Cited

U.S. PATENT DOCUMENTS 3,617,636 A 11/1971 Ogihara ..................... 179/1 SA
3,649,765 A * 3/1972 Rabiner et al. ............... 704/209
(Continued)

FOREIGN PATENT DOCUMENTS

CN 101027543 A 8/2007
CN 101394906 A 3/2009
(Continued)

OTHER PUBLICATIONS

Xia, Xiang-Gen, "Discrete Chirp-Fourier Transform and Its Application to Chirp Rate Estimation", *IEEE Transactions on Signal Processing*, vol. 48, No. 11, Nov. 2000, pp. 3122-3133.
(Continued)

*Primary Examiner* — Pierre-Louis Desir
*Assistant Examiner* — Anne Thomas-Homescu
(74) *Attorney, Agent, or Firm* — Edell, Shapiro & Finnan, LLC

(57) ABSTRACT

A system and method may be configured to analyze audio information derived from an audio signal. The system and method may track sound pitch across the audio signal. The tracking of pitch across the audio signal may take into account change in pitch by determining at individual time sample windows in the signal duration an estimated pitch and a representation of harmonic envelope at the estimated pitch. The estimated pitch and the representation of harmonic envelope may then be implemented to determine an estimated pitch for another time sample window in the signal duration with an enhanced accuracy and/or precision.

24 Claims, 6 Drawing Sheets

(51) Int. Cl.

| | |
|---|---|
| ***G10L 19/00*** | (2013.01) |
| ***G10L 21/00*** | (2013.01) |
| ***G10L 25/90*** | (2013.01) |
| ***G10L 19/12*** | (2013.01) |
| ***G10L 21/04*** | (2013.01) |
| ***H04R 29/00*** | (2006.01) |

(56) References Cited

U.S. PATENT DOCUMENTS 4,349,699 A * 9/1982 Asada .................... G10L 25/00 704/263
4,454,609 A 6/1984 Kates
4,611,342 A * 9/1986 Miller .................... G10L 19/04 341/139
4,797,923 A 1/1989 Clarke
5,054,072 A * 10/1991 McAulay et al. ............ 704/207
5,121,428 A * 6/1992 Uchiyama ............... G10L 17/02 704/243
5,195,166 A 3/1993 Hardwick et al. ................ 395/2
5,216,747 A 6/1993 Hardwick et al. ................ 395/2
5,226,108 A 7/1993 Hardwick et al. ................ 395/2
5,253,326 A * 10/1993 Yong ....................... G10L 19/06 704/200
5,321,636 A 6/1994 Beerends ...................... 364/485
5,384,891 A * 1/1995 Asakawa ................ G06T 9/008 704/220
5,548,680 A 8/1996 Cellario ....................... 395/2.28
5,617,505 A * 4/1997 Kane ....................... G10L 15/20 704/210
5,617,507 A * 4/1997 Lee ......................... G10L 13/04 704/200
5,651,090 A * 7/1997 Moriya ................... G06T 9/008 704/200.1
5,684,920 A * 11/1997 Iwakami ............. G10L 19/0204 704/201
5,701,390 A * 12/1997 Griffin .................... G10L 19/02 704/205
5,765,127 A * 6/1998 Nishiguchi ......... G10L 19/0212 704/208
5,812,967 A 9/1998 Ponceleon et al.
5,815,580 A 9/1998 Craven et al.
5,873,059 A * 2/1999 Iijima ................... G10L 13/033 704/205
5,897,614 A * 4/1999 McKiel, Jr. ............. G10L 25/48 704/208
5,930,747 A * 7/1999 Iijima ..................... G10L 25/90 704/207
6,161,089 A * 12/2000 Hardwick ............... G10L 19/16 704/219
6,356,868 B1 3/2002 Yuschik et al. ............... 704/246
6,377,915 B1 * 4/2002 Sasaki ..................... G10L 19/04 704/206
6,456,965 B1 * 9/2002 Yeldener ................. G10L 25/90 704/207
6,477,472 B2 11/2002 Qian et al. ...................... 702/35
6,526,376 B1 * 2/2003 Villette et al. ................ 704/207
6,629,067 B1 * 9/2003 Saito ...................... G10H 1/366 381/56
6,708,145 B1 * 3/2004 Liljeryd ................ G10L 21/038 704/200.1
6,725,190 B1 * 4/2004 Cohen ..................... G10L 13/07 704/203
6,879,953 B1 * 4/2005 Oishi ...................... G10L 15/22 704/205
7,003,120 B1 2/2006 Smith et al.
7,016,352 B1 3/2006 Chow et al.
7,117,149 B1 10/2006 Zakarauskas
7,249,015 B2 7/2007 Jiang et al.
7,389,230 B1 6/2008 Nelken
7,596,489 B2 9/2009 Kovesi et al.
7,660,718 B2 2/2010 Padhi et al. .................. 704/268
7,664,640 B2 2/2010 Webber
7,668,711 B2 2/2010 Chong et al.
7,672,836 B2 3/2010 Lee et al. ...................... 704/207
7,774,202 B2 8/2010 Spengler et al.
7,983,904 B2 * 7/2011 Ehara et al. .................. 704/205
7,991,167 B2 8/2011 Oxford
8,024,180 B2 * 9/2011 Lee ....................... G10L 19/093 704/203
8,065,140 B2 * 11/2011 Sakurai et al. ............... 704/217
8,189,576 B2 5/2012 Ferguson
8,212,136 B2 7/2012 Shirai et al.
8,219,390 B1 * 7/2012 Laroche .............. G10L 21/0272 704/207
8,332,059 B2 12/2012 Herre et al.
8,447,596 B2 5/2013 Avendano et al.
8,548,803 B2 10/2013 Bradley et al. ............... 704/208
8,620,646 B2 12/2013 Bradley et al.
8,645,128 B1 * 2/2014 Agiomyrgiannakis . G10L 25/90 704/207
8,666,092 B2 3/2014 Zavarehei
8,767,978 B2 7/2014 Bradley et al.
9,224,406 B2 * 12/2015 Bonada ................... G10L 25/90
2002/0133333 A1 * 9/2002 Ito ........................... G10L 19/10 704/208
2002/0152078 A1 * 10/2002 Yuschik et al. ............... 704/273
2003/0014245 A1 1/2003 Brandman
2003/0055646 A1 3/2003 Yoshioka et al.
2003/0078768 A1 * 4/2003 Silverman ............... G10L 17/26 704/206
2003/0135374 A1 * 7/2003 Hardwick ............... G10L 13/02 704/264
2003/0187635 A1 * 10/2003 Ramabadran ........... G10L 19/06 704/217
2004/0002856 A1 * 1/2004 Bhaskar ................ G10L 19/097 704/219
2004/0128130 A1 * 7/2004 Rose ....................... G10L 15/02 704/236
2004/0133424 A1 7/2004 Ealey et al. .................. 704/233
2004/0138886 A1 * 7/2004 Absar ................... G10L 19/025 704/240
2004/0158466 A1 * 8/2004 Miranda ............. G10L 15/1807 704/236
2004/0172240 A1 * 9/2004 Crockett ................. G10L 25/48 704/205
2004/0176949 A1 9/2004 Wenndt et al.
2004/0199381 A1 * 10/2004 Sorin ...................... G10L 15/02 704/207
2004/0220475 A1 11/2004 Szabo et al.
2005/0114128 A1 5/2005 Hetherington et al.
2005/0137871 A1 * 6/2005 Capman .............. G10L 19/0018 704/268
2005/0149321 A1 7/2005 Kabi et al. .................... 704/207
2005/0177372 A1 * 8/2005 Wang ................ G06K 9/00536 704/273
2005/0278173 A1 * 12/2005 Joublin ................... G10L 25/48 704/229
2006/0080087 A1 * 4/2006 Vandali .............. A61N 1/36032 704/207
2006/0080088 A1 * 4/2006 Lee et al. ...................... 704/207
2006/0100866 A1 5/2006 Alewine et al.
2006/0122834 A1 6/2006 Bennett
2006/0149558 A1 7/2006 Kahn et al.
2006/0262943 A1 11/2006 Oxford
2006/0285665 A1 * 12/2006 Wasserblat .............. G10L 17/26 379/114.14
2007/0010997 A1 1/2007 Kim
2007/0192100 A1 * 8/2007 Rosec ..................... G10L 21/00 704/246
2007/0250313 A1 * 10/2007 Chen ....................... G10L 17/26 704/233
2007/0288232 A1 * 12/2007 Kim ...................... G10L 19/093 704/206
2007/0288236 A1 * 12/2007 Kim ........................ G10L 25/93 704/231
2007/0299658 A1 * 12/2007 Wang et al. .................. 704/207
2008/0082323 A1 4/2008 Bai et al.
2008/0183473 A1 7/2008 Nagano et al.
2008/0234959 A1 * 9/2008 Joublin ................... G10L 25/90 702/75
2008/0270440 A1 10/2008 He et al.
2008/0304672 A1 * 12/2008 Yoshizawa ............. G08G 1/017 381/56
2009/0012638 A1 1/2009 Lou

(56) References Cited

U.S. PATENT DOCUMENTS

| | | | | |
|---|---|---|---|---|
| 2009/0067647 | A1* | 3/2009 | Yoshizawa .......... G10L 21/0272 381/119 | |
| 2009/0076822 | A1* | 3/2009 | Sanjaume ............. G10L 19/093 704/268 | |
| 2009/0091441 | A1 | 4/2009 | Schweitzer, III et al. .... 340/531 | |
| 2009/0119096 | A1* | 5/2009 | Gerl .................... G10L 21/0208 704/207 | |
| 2009/0228272 | A1* | 9/2009 | Herbig .................... G10L 25/78 704/233 | |
| 2009/0240489 | A1* | 9/2009 | Aoyagi ................. G10L 21/038 704/205 | |
| 2009/0326942 | A1* | 12/2009 | Fulop ...................... G10L 17/02 704/246 | |
| 2010/0042407 | A1 | 2/2010 | Crockett .................... 704/200.1 | |
| 2010/0106503 | A1* | 4/2010 | Farrell .................... G10L 17/04 704/246 | |
| 2010/0177916 | A1* | 7/2010 | Gerkmann .......... G10L 21/0208 381/317 | |
| 2010/0215191 | A1 | 8/2010 | Yoshizawa et al. | |
| 2010/0260353 | A1 | 10/2010 | Ozawa | |
| 2010/0262420 | A1 | 10/2010 | Herre et al. .................. 704/201 | |
| 2010/0268538 | A1* | 10/2010 | Ryu ........................ G10L 17/00 704/250 | |
| 2010/0332222 | A1 | 12/2010 | Bai et al. | |
| 2011/0016077 | A1 | 1/2011 | Vasilache et al. | |
| 2011/0060564 | A1 | 3/2011 | Hoge | |
| 2011/0191102 | A1* | 8/2011 | Espy-Wilson ...... G10L 21/0272 704/207 | |
| 2011/0276323 | A1* | 11/2011 | Seyfetdinov ............ G06F 21/32 704/207 | |
| 2011/0282658 | A1* | 11/2011 | Wang .................. G10L 21/0272 704/208 | |
| 2011/0286618 | A1* | 11/2011 | Vandali .............. A61N 1/36032 381/320 | |
| 2011/0288860 | A1* | 11/2011 | Schevciw ............... G10L 25/78 704/233 | |
| 2012/0046771 | A1* | 2/2012 | Abe ......................... G10H 1/16 700/94 | |
| 2012/0053933 | A1* | 3/2012 | Tamura ................... G10L 13/04 704/207 | |
| 2012/0243694 | A1* | 9/2012 | Bradley et al. ................. 381/56 | |
| 2012/0243705 | A1* | 9/2012 | Bradley et al. .............. 381/94.4 | |
| 2012/0243707 | A1* | 9/2012 | Bradley et al. ................. 381/98 | |
| 2012/0265534 | A1 | 10/2012 | Coorman et al. | |
| 2013/0041489 | A1 | 2/2013 | Bradley et al. ................. 700/94 | |
| 2013/0041656 | A1 | 2/2013 | Bradley et al. ............... 704/207 | |
| 2013/0041657 | A1 | 2/2013 | Bradley et al. ............... 704/207 | |
| 2013/0041658 | A1 | 2/2013 | Bradley et al. ............... 704/208 | |
| 2013/0051571 | A1* | 2/2013 | Nagel ................. G10L 19/0204 381/56 | |
| 2014/0037095 | A1 | 2/2014 | Bradley et al. | |
| 2014/0086420 | A1 | 3/2014 | Bradley et al. | |
| 2015/0206540 | A1* | 7/2015 | Green ..................... G10L 19/00 704/207 | |

FOREIGN PATENT DOCUMENTS

| | | | |
|---|---|---|---|
| EP | 1744 305 | A2 | 1/2007 |
| JP | 01-257233 | A | 10/1989 |
| WO | WO 2012/129255 | | 9/2012 |
| WO | WO 2012/134991 | | 10/2012 |
| WO | WO 2012/134993 | | 10/2012 |
| WO | WO 2013/022914 | | 2/2013 |
| WO | WO 2013/022918 | | 2/2013 |
| WO | WO 2013/022923 | | 2/2013 |
| WO | WO 2013/022930 | | 2/2013 |

OTHER PUBLICATIONS

Boashash, Boualem, "Time-Frequency Signal Analysis and Processing: A Comprehensive Reference", [online], Dec. 2003, retrieved on Sep. 26, 2012 from http://qspace.qu.edu.qa/bitstream/handle/10576/10686/Boashash%20book-part1_tfsap_concepts.pdf?seq . . . , 103 pages.

Yin et al., "Pitch- and Formant-Based Order Adaptation of the Fractional Fourier Transform and Its Application to Speech Recognition", *EURASIP Journal of Audio, Speech, and Music Processing,*, vol. 2009, Article ID 304579, [online], Dec. 2009, Retrieved on Sep. 26, 2012 from http://downloads.hindawi.com/journals/asmp/2009/304579.pdf, 14 pages.

Kepesi, Marian, et al., "Adaptive Chirp-Based Time-Frequency Analysis of Speech Signals", *Speech Communication*, vol. 48, No. 5, 2006, pp. 474-492.

Ioana, Cornel, et al., "The Adaptive Time-Frequency Distribution Using the Fractional Fourier Transform", *18° Colloque sur le traitement du signal et des images*, 2001, pp. 52-55.

Abatzoglou, Theagenis J., "Fast Maximum Likelihood Joint Estimation of Frequency and Frequency Rate", *IEEE Transactions on Aerospace and Electronic Systems*, vol. AES-22, Issue 6, Nov. 1986, pp. 708-715.

Rabiner, Lawrence R., "On the Use of Autocorrelation Analysis for Pitch Detection", *IEEE Transactions on Acoustics, Speech, and Signal Processing*, vol. ASSP-25, No. 1, Feb. 1977, pp. 24-33.

Lahat, Meir, et al., "A Spectral Autocorrelation Method for Measurement of the Fundamental Frequency of Noise-Corrupted Speech", *IEEE Transactions on Acoustics, Speech, and Signal Processing*, vol. ASSP-35, No. 6, Jun. 1987, pp. 741-750.

Robel, A., et al., "Efficient Spectral Envelope Estimation and Its Application to Pitch Shifting and Envelope Preservation", *Proc. Of the 8th Int. Conference on Digital Audio Effects* (*DAFx'05*), Madrid, Spain, Sep. 20-22, 2005, 6 pages.

Kepesi, Marian, et al., "High-Resolution Noise-Robust Spectral-Based Pitch Estimation", 2005, 4 pages.

Hu, Guoning, et al., "Monaural Speech Segregation Based on Pitch Tracking and Amplitude Modulation", *IEEE Transactions on Neural Networks*, vol. 15, No. 5, Sep. 2004, 16 pages.

Roa, Sergio, et al., "Fundamental Frequency Estimation Based on Pitch-Scaled Harmonic Filtering", 2007, 4 pages.

Badeau et al., "Expectation-Maximization Algorithm for Multi-Pitch Estimation and Separation of Overlapping Harmonic Spectra", *IEEE International Conference on Acoustics, Speech and Signal Processing* (*ICASSP*), Apr. 2009, 4 pages.

Camacho et al., "A Sawtooth Waveform Inspired Pitch Estimator for Speech and Music", *Journal of the Acoustical Society of America*, vol. 124, No. 3, Sep. 2008, pp. 1638-1652.

Adami et al., "Modeling Prosodic Dynamics for Speaker Recognition," Proceedings of IEEE International Conference in Acoustics, Speech and Signal Processing (ICASSP '03), Hong Kong, 2003.

Cooke et al., "Robust Automatic Speech Recognition with Missing and Unreliable Acoustic Data," Speech Communication, vol. 34, Issue 3, pp. 267-285, Jun. 2001.

Cycling 74, "MSP Yutorial 26: Frequency Domain Signal Processing with pfft~" Jul. 6, 2008 (Captured via Internet Archive) http://www.cycling74.com.

Kamath et al, "Independent Component Analysis for Audio Classification", *IEEE 11th Digital Signal Processing Workshop & IEEE Signal Processing Education Workshop*, 2004, [retrieved on: May 31, 2012], retrieved from the Internet: http://2002.114.89.42/resource/pdf/1412.pdf, pp. 352-355.

Kumar et al., "Speaker Recognition Using GMM", *International Journal of Engineering Science and Technology*, vol. 2, No. 6, 2010, [retrieved on: May 31, 2012], retrieved from the Internet: http://www.ijest.info/docs/IJEST10-02-06-112.pdf, pp. 2428-2436.

Serra, "Musical Sound Modeling with Sinusoids plus Noise", 1997, pp. 1-25.

Vargas-Rubio et al., "An Improved Spectrogram Using the Multiangle Centered Discrete Fractional Fourier Transform", Proceedings of International Conference on Acoustics, Speech, and Signal Processing, Philadelphia, 2005 [retrieved on Jun. 24, 2012], retrieved from the internet: <URL: http://www.ece.unm.edu/faculty/beanthan/PUB/ICASSP-05-JUAN.pdf>, 4 pages.

Werauaga et al., Adaptive Chirp-Based Time-Frequency Analysis of Speech Signals, Speech Communication, vol. 48, No. 5, pp. 474-492 (2006).

(56) References Cited

OTHER PUBLICATIONS

Weruaga, Luis, et al., "Speech Analysis with the Fast Chirp Transform", Eusipco, www.eurasip.org/Proceedings/Eusipco/Eusipco2004/.../cr1374.pdf, 2004, 4 pages.
Doval et al., "Fundamental Frequency Estimation and Tracking Using Maximum Likelihood Harmonic Matching and HMMs," *IEEE International Conference on Acoustics, Speech, and Signal Processing, Proceedings*, New York, NY, 1:221-224 (Apr. 27, 1993).
Extended European Search Report mailed Feb. 12, 2015, as received in European Patent Application No. 12 821 868.2.
Extended European Search Report mailed Oct. 9, 2014, as received in European Patent Application No. 12 763 782.5.
Extended European Search Report mailed Mar. 12, 2015, as received in European Patent Application No. 12 822 218.9.
Goto, "A Robust Predominant-FO Estimation Method for Real-Time Detection of Melody and Bass Lines in CD Recordings," *Acoustics, Speech, and Signal Processing*, Piscataway, NJ, 2(5):757-760 (Jun. 5, 2000).
International Search Report and Written Opinion mailed Jul. 5, 2012, as received in International Application No. PCT/US2012/030277.
International Search Report and Written Opinion mailed Jun. 7, 2012, as received in International Application No. PCT/US2012/030274.
International Search Report and Written Opinion mailed Oct. 23, 2012, as received in International Application No. PCT/US2012/049901.
International Search Report and Written Opinion mailed Oct. 19, 2012, as received in International Application PCT/US2012/049909.
Mowlaee et al., "Chirplet Representation for Audio Signals Based on Model Order Selection Criteria," Computer Syaytems and Applications, AICCSA 2009, IEEE/ACSInternational Conference on IEEE, Piscataway, NJ, pp. 927-934 (May 10, 2009).
Weruaga et al., "The Fan-Chirp Transform for Non-Stationary Harmonic Signals," *Signal Processing*, Elsevier Science Publishers B.V. Amsterdam, NL, 87(6): 1504-1522 (2007).

* cited by examiner

SYSTEM AND METHOD FOR TRACKING SOUND PITCH ACROSS AN AUDIO SIGNAL USING HARMONIC ENVELOPE

FIELD

The invention relates to tracking sound pitch across an audio signal through analysis of audio information that tracks harmonic envelope as well as pitch, and leverages a representation of harmonic envelope in vector form along with pitch to track the pitch of individual sounds.

BACKGROUND

Systems and techniques for tracking sound pitch across an audio signal are known. Known techniques implement a transform to transform the audio signal into the frequency domain (e.g., Fourier Transform, Fast Fourier Transform, Short Time Fourier Transform, and/or other transforms) for individual time sample windows, and then attempt to identify pitch within the individual time sample windows by identifying spikes in energy at harmonic frequencies. These techniques assume pitch to be static within the individual time sample windows. As such, these techniques fail to account for the dynamic nature of pitch within the individual time sample windows, and may be inaccurate, imprecise, and/or costly from a processing and/or storage perspective.

SUMMARY

One aspect of the disclosure relates to a system and method configured to analyze audio information derived from an audio signal. The system and method may track sound pitch across the audio signal. The tracking of pitch across the audio signal may take into account change in pitch by determining at individual time sample windows in the signal duration an estimated pitch and a representation of harmonic envelope at the estimated pitch. The estimated pitch and the representation of harmonic envelope may then be implemented to determine an estimated pitch for another time sample window in the signal duration with an enhanced accuracy and/or precision.

In some implementations, a system configured to analyze audio information may include one or more processors configured to execute computer program modules. The computer program modules may include one or more of an audio information module, a processing window module, a primary window module, a pitch estimation module, an envelope vector module, an envelope correlation module, a weighting module, an estimated pitch aggregation module, a voiced section module, and/or other modules.

The audio information module may be configured to obtain audio information derived from an audio signal representing one or more sounds over a signal duration. The audio information correspond to the audio signal during a set of discrete time sample windows. The audio information may specify a magnitude of an intensity coefficient related to an intensity of the audio signal as a function and/or fractional chirp rate of frequency during the first time sample window. The audio information may specify, as a function of pitch and fractional chirp rate, a pitch likelihood metric for the individual time sample windows. The pitch likelihood metric for a given pitch and a given fractional chirp rate in a given time sample window may indicate the likelihood a sound represented by the audio signal had the given pitch and the given fractional chirp rate during the given time sample window.

The audio information module may be configured such that the audio information includes transformed audio information. The transformed audio information for a time sample window may specify magnitude of a coefficient related to signal intensity as a function of frequency for an audio signal within the time sample window. In some implementations, the transformed audio information for the time sample window may include a plurality of sets of transformed audio information. The individual sets of transformed audio information may correspond to different fractional chirp rates. Obtaining the transformed audio information may include transforming the audio signal, receiving the transformed audio information in a communications transmission, accessing stored transformed audio information, and/or other techniques for obtaining information.

The processing window module may be configured to define one or more processing time windows within the signal duration. An individual processing time window may include a plurality of time sample windows. The processing time windows may include a plurality of overlapping processing time windows that span some or all of the signal duration. For example, the processing window module may be configured to define the processing time windows by incrementing the boundaries of the processing time window over the span of the signal duration. The processing time windows may correspond to portions of the signal duration during which the audio signal represents voiced sounds.

The primary window module may be configured to identify, for a processing time window, a primary time sample window within the processing time window. This primary time sample window may become the starting point from which pitch may be tracked forward and/or backward with respect to time through the processing time window.

The pitch estimation module may be configured to determine, for the individual time sample windows in the processing time window, estimated pitch and estimated fractional chirp rate. For the primary time sample window, this may be performed by determining the estimated pitch and the estimated fractional chirp rate randomly, through an analysis of the pitch likelihood metric, by rule, by user selection, and/or based on other criteria. For other time sample windows in the processing time window, the pitch estimation module may be configured to determine estimated pitch and estimated fractional chirp rate by iterating through the processing time window from the primary time sample window and determining the estimated pitch and/or estimated fractional chirp rate for a given time sample window based on (i) the pitch likelihood metric specified by the transformed audio information for the given time sample window, and (ii) for a correlation between harmonic envelope at different pitches in the given time sample window and the harmonic envelope at an estimated pitch for a time sample window adjacent to the given time sample window.

To facilitate the determination of an estimated pitch and/or estimated fractional chirp rate for a first time sample window between the primary time sample window and a boundary of the processing time window, the envelope vector module may be configured to determine envelope vectors for sound in the first time sample window as a function of pitch and/or fractional chirp rate. The envelope vector module may be configured to determine the envelope vector for a given pitch and/or fractional chirp rate in the first time sample window based on the values for the intensity coefficient at harmonic frequencies of the given pitch in the first time sample window. For example, the coordinates of the envelope vector for the given pitch and/or fractional chirp rate may be the values for the intensity coefficient at the first n harmonic frequencies (or some other set of harmonic frequencies).

The envelope correlation module may be configured to obtain an envelope vector for a sound represented by the audio signal during a second time sample window. The envelope vector may be for an estimated pitch and/or estimated fractional chirp rate of the second time sample window. The envelope correlation module may be configured to determine, for the first time sample window, values of a correlation metric as a function of pitch from the envelope vectors determined by the envelope vector module for the first time sample window and the obtained envelope vector for the second time sample window. The value of the correlation metric for a given pitch and/or fractional chirp rate in the first time sample window may indicate a level of correlation between the obtained envelope vector for the second time sample window and the envelope vector for the given pitch and/or fractional chirp rate in the first time sample window.

The weighting module may be configured to weight the pitch likelihood metric for the first time sample window. This weighting may be based on one or more of a predicted pitch for the first time sample window, the values for the correlation metric in the first time sample window, and/or other weighting parameters.

The weighting performed by the weighting module may apply relatively larger weights to the pitch likelihood metric at pitches and/or fractional chirp rates having correlation metric values in the first time sample window that indicate relatively high correlation with the envelope vector for the second time sample window. The weighting may apply relatively smaller weights to the pitch likelihood metric at pitches and/or fractional chirp rates having correlation metric values in the first time sample window that indicate relatively low correlation with the envelope vector for the second time sample window.

Once the pitch likelihood metric for the first time sample window has been weighted, the pitch estimation module may be configured to determine an estimated pitch for the first time sample window based on the weighted pitch likelihood metric. This may include identifying the pitch and/or the fractional chirp rate for which the weighted pitch likelihood metric is a maximum in the first time sample window.

In implementations in which the processing time windows include overlapping processing time windows within at least a portion of the signal duration, a plurality of estimated pitches may be determined for the first time sample window. For example, the first time sample window may be included within two or more of the overlapping processing time windows. The paths of estimated pitch and/or estimated chirp rate through the processing time windows may be different for individual ones of the overlapping processing time windows. As a result the estimated pitch and/or chirp rate upon which the determination of estimated pitch for the first time sample window may be different within different ones of the overlapping processing time windows. This may cause the estimated pitches determined for the first time sample window to be different. The estimated pitch aggregation module may be configured to determine an aggregated estimated pitch for the first time sample window by aggregating the plurality of estimated pitches determined for the first time sample window.

The estimated pitch aggregation module may be configured such that determining an aggregated estimated pitch. The determination of a mean, a selection of a determined estimated pitch, and/or other aggregation techniques may be weighted (e.g., based on pitch likelihood metric corresponding to the estimated pitches being aggregated).

The voiced section module may be configured to categorize time sample windows into a voiced category, an unvoiced category, and/or other categories. A time sample window categorized into the voiced category may correspond to a portion of the audio signal that represents harmonic sound. A time sample window categorized into the unvoiced category may correspond to a portion of the audio signal that does not represent harmonic sound. Time sample windows categorized into the voiced category may be validated to ensure that the estimated pitches for these time sample windows are accurate. Such validation may be accomplished, for example, by confirming the presence of energy spikes at the harmonics of the estimated pitch in the transformed audio information, confirming the absence in the transformed audio information of periodic energy spikes at frequencies other than those of the harmonics of the estimated pitch, and/or through other techniques.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of “a”, “an”, and “the” include plural referents unless the context clearly dictates otherwise.

DETAILED DESCRIPTION

Figure 1:
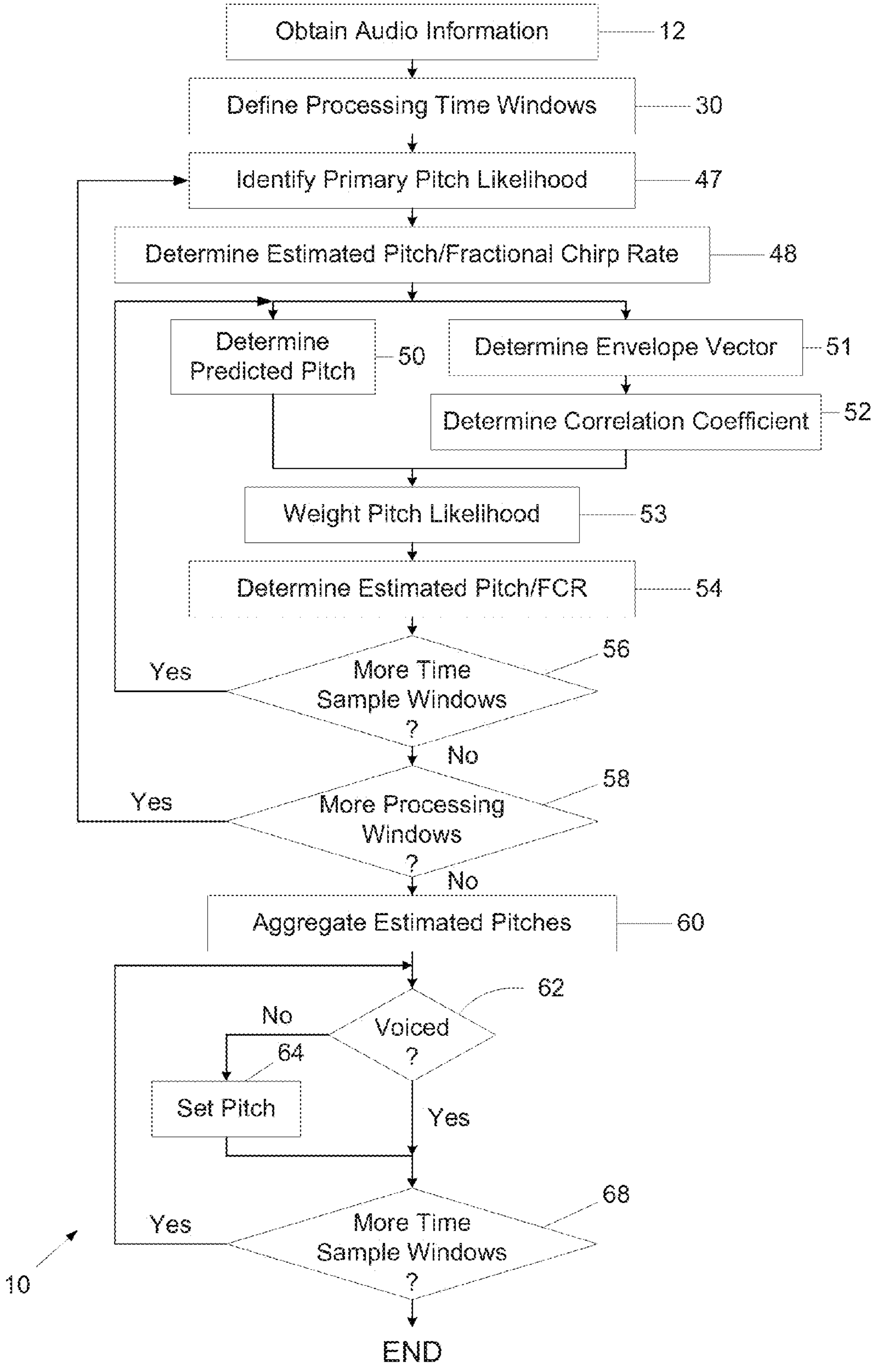
FIG. 1 illustrates a method of analyzing audio information.

FIG. 1 illustrates a method 10 of analyzing audio information derived from an audio signal representing one or more sounds. The method 10 may be configured to determine pitch of the sounds represented in the audio signal with an enhanced accuracy, precision, speed, and/or other enhancements. The method 10 may include tracking a harmonic envelope of a sound across the audio signal to enhance pitch-tracking of the sound across time.

At an operation 12, audio information derived from an audio signal may be obtained. The audio signal may represent one or more sounds. The audio signal may have a signal duration. The audio information may include audio information that corresponds to the audio signal during a set of discrete time sample windows. The time sample windows may correspond to a period (or periods) of time larger than the sampling period of the audio signal. As a result, the audio information for a time sample window may be derived from and/or represent a plurality of samples in the audio signal. By way of non-limiting example, a time sample window may correspond to an amount of time that is greater than about 15 milliseconds, and/or other amounts of time. In some implementations, the time windows may correspond to about 10 milliseconds, and/or other amounts of time.

The audio information obtained at operation 12 may include transformed audio information. The transformed audio information may include a transformation of an audio signal into the frequency domain (or a pseudo-frequency domain) such as a Fourier Transform, a Fast Fourier Transform, a Short Time Fourier Transform, and/or other transforms. The transformed audio information may include a transformation of an audio signal into a frequency-chirp domain, as described, for example, in U.S. patent application Ser. No. 13/205,424, filed Aug. 8, 2011, and entitled "System And Method For Processing Sound Signals Implementing A Spectral Motion Transform" ("the '424 application") which is hereby incorporated into this disclosure by reference in its entirety. The transformed audio information may have been transformed in discrete time sample windows over the audio signal. The time sample windows may be overlapping or non-overlapping in time. Generally, the transformed audio information may specify magnitude of an intensity coefficient related to signal intensity as a function of frequency (and/or other parameters) for an audio signal within a time sample window. In the frequency-chirp domain, the transformed audio information may specify magnitude of the coefficient related to signal intensity as a function of frequency and fractional chirp rate. Fractional chirp rate may be, for any harmonic in a sound, chirp rate divided by frequency.

Figure 2:
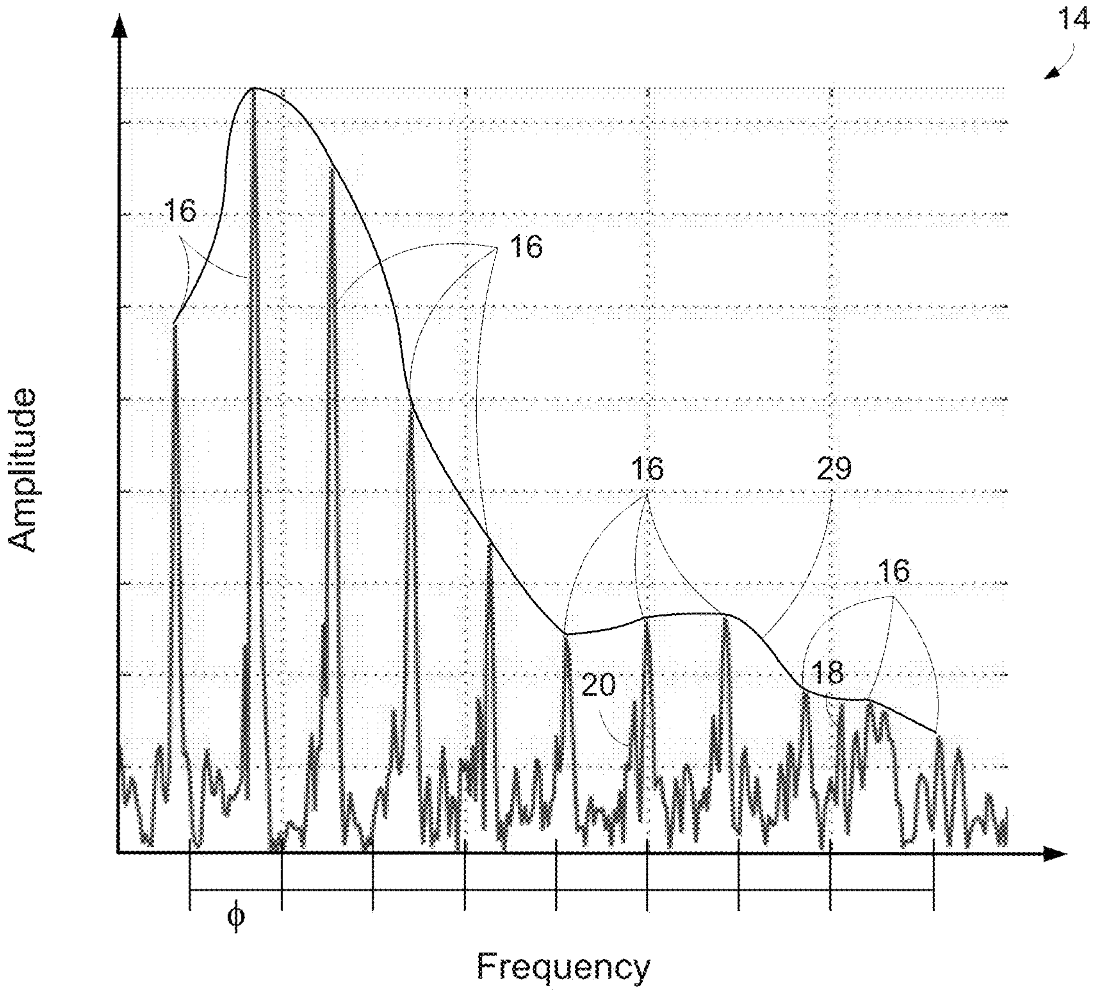
FIG. 2 illustrates plot of a coefficient related to signal intensity as a function of frequency.

By way of illustration, FIG. 2 depicts a plot 14 of transformed audio information. The plot 14 may be in a space that shows a magnitude of a coefficient related to energy as a function of frequency. The transformed audio information represented by plot 14 may include a harmonic sound, represented by a series of spikes 16 in the magnitude of the coefficient at the frequencies of the harmonics of the harmonic sound. Assuming that the sound is harmonic, spikes 16 may be spaced apart at intervals that correspond to the pitch (ϕ) of the harmonic sound. As such, individual spikes 16 may correspond to individual ones of the harmonics of the harmonic sound.

Other spikes (e.g., spikes 18 and/or 20) may be present in the transformed audio information. These spikes may not be associated with harmonic sound corresponding to spikes 16. The difference between spikes 16 and spike(s) 18 and/or 20 may not be amplitude, but instead frequency, as spike(s) 18 and/or 20 may not be at a harmonic frequency of the harmonic sound. As such, these spikes 18 and/or 20, and the rest of the amplitude between spikes 16 may be a manifestation of noise in the audio signal. As used in this instance, "noise" may not refer to a single auditory noise, but instead to sound (whether or not such sound is harmonic, diffuse, white, or of some other type) other than the harmonic sound associated with spikes 16.

In some implementations, the transformed audio information may represent all of the energy present in the audio signal, or a portion of the energy present in the audio signal. For example, if the transformed on the audio signal places the audio signal into a frequency-chirp domain, the coefficient related to energy may be specified as a function of frequency and fractional chirp rate (e.g., as described in the '424 application). In such examples, the transformed audio information for a given time sample window may include a representation of the energy present in the audio signal having a common fractional chirp rate (e.g., a one-dimensional slice through the two-dimensional frequency-domain along a single fractional chirp rate).

Referring back to FIG. 1, in some implementations, the audio information obtained at operation 12 may represent a pitch likelihood metric as a function of pitch and chirp rate. The pitch likelihood metric at a time sample window for a given pitch and a given fractional chirp rate may indicate the likelihood that a sound represented in the audio signal at the time sample window has the given pitch and the given fractional chirp rate. Such audio information may be derived from the audio signal, for example, by the systems and/or methods described in U.S. patent application Ser. No. 13/205,455, filed Aug. 8, 2011, and entitled "System And Method For Analyzing Audio Information To Determine Pitch And/Or Fractional Chirp Rate" (the '455 application) which is hereby incorporated into the present disclosure in its entirety.

Figure 3:
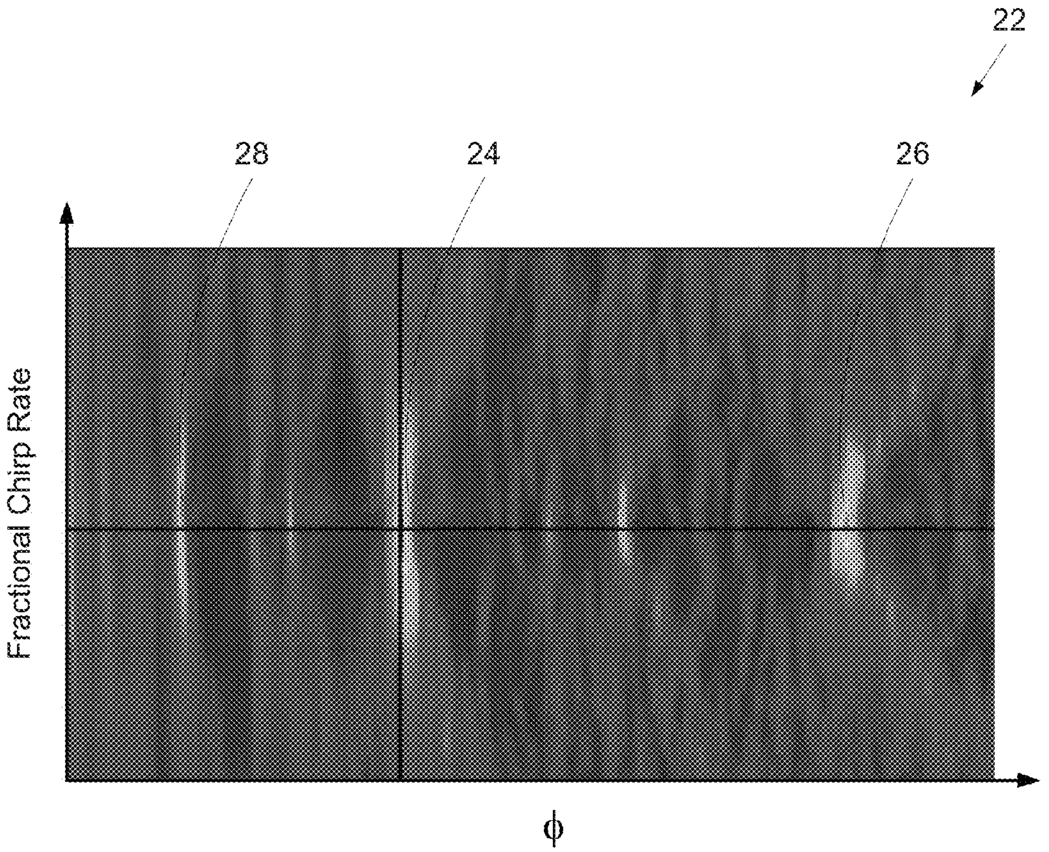
FIG. 3 illustrates a space in which a pitch likelihood metric is specified as a function of pitch and fractional chirp rate.

By way of illustration, FIG. 3 shows a space 22 in which pitch likelihood metric may be defined as a function pitch and fractional chirp rate for a sample time window. In FIG. 3, magnitude of pitch likelihood metric may be depicted by shade (e.g., lighter=greater magnitude). As can be seen, maxima for the pitch likelihood metric may be two-dimensional maxima on pitch and fractional chirp rate. The maxima may include a maximum 24 at the pitch of a sound represented in the audio signal within the time sample window, a maximum 26 at twice the pitch, a maximum 28 at half the pitch, and/or other maxima.

Figure 4:
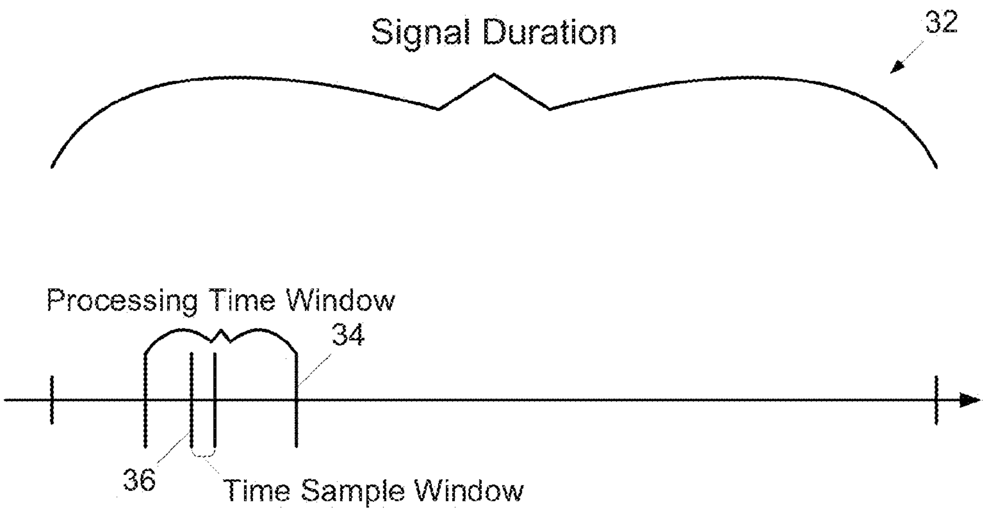
FIG. 4 illustrates a timeline of a signal duration including a defined processing time window and a time sample window within the processing time window.

Turning back to FIG. 1, at an operation 30, a plurality of processing time windows may be defined across the signal duration. A processing time window may include a plurality of time sample windows. The processing time windows may correspond to a common time length. By way of illustration, FIG. 4 illustrates a timeline 32. Timeline 32 may run the length of the signal duration. A processing time window 34 may be defined over a portion of the signal duration. The processing time window 34 may include a plurality of time sample windows, such as time sample window 36.

Referring again to FIG. 1, in some implementations, operation 30 may include identifying, from the audio information, portions of the signal duration for which harmonic sound (e.g., human speech) may be present. Such portions of the signal duration may be referred to as "voiced portions" of the audio signal. In such implementations, operation 30 may include defining the processing time windows to correspond to the voiced portions of the audio signal.

Figure 5:
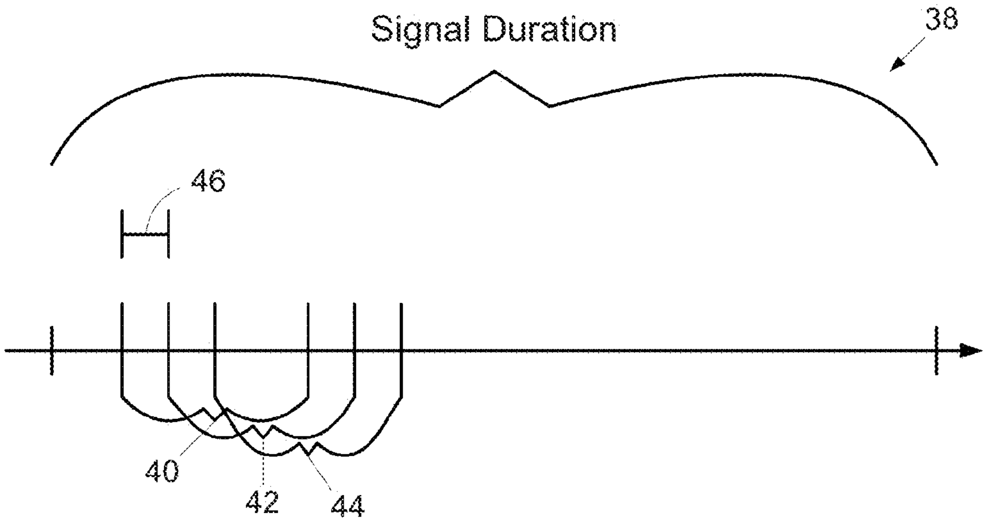
FIG. 5 illustrates a timeline of signal duration including a plurality of overlapping processing time windows.

In some implementations, the processing time windows may include a plurality of overlapping processing time windows. For example, for some or all of the signal duration, the overlapping processing time windows may be defined by incrementing the boundaries of the processing time windows by some increment. This increment may be an integer number of time sample windows (e.g., 1, 2, 3, and/or other integer numbers). By way of illustration, FIG. 5 shows a timeline 38 depicting a first processing time window 40, a second processing time window 42, and a third processing time window 44, which may overlap. The processing time windows 40, 42, and 44 may be defined by incrementing the boundaries by an increment amount illustrated as 46. The incrementing of the boundaries may be performed, for example, such that a set of overlapping processing time windows including windows 40, 42, and 44 extend across the entirety of the signal duration, and/or any portion thereof.

Turning back to FIG. 1, at an operation 47, for a processing time window defined at operation 30, a primary time sample window within the processing time window may be identified. In some implementations, the primary time sample window may be identified randomly, based on some analysis of pitch likelihood, by rule or parameter, based on user selection, and/or based on other criteria. In some implementations, identifying the primary time sample window may include identifying a maximum pitch likelihood. The time sample window having the maximum pitch likelihood may be identified as the primary time sample window. The maximum pitch likelihood may be the largest likelihood for any pitch and/or chirp rate across the time sample windows within the processing time window. As such, operation 30 may include scanning the audio information for the time sample windows within the processing time window that specifies the pitch likelihood metric for the time sample windows, and identifying the maximum value for the pitch likelihood within all of these processing time windows.

At an operation 48, an estimated pitch for the primary time sample window may be determined. In some implementations, the estimated pitch may be selected randomly, based on an analysis of pitch likelihood within the primary time sample window, by rule or parameter, based on user selection, and/or based on other criteria. As was mentioned above, the audio information may indicate, for a given time sample window, the pitch likelihood metric as a function of pitch. As such, the estimated pitch for the primary time sample window may be determined as the pitch for exhibiting a maximum for pitch likelihood metric for the primary time sample window.

As was mentioned above, in the audio information the pitch likelihood metric may further be specified as a function of fractional chirp rate. As such, the pitch likelihood metric may indicate chirp likelihood as a function of the pitch likelihood metric and pitch. At operation 48, in addition to the estimated pitch, an estimated fractional chirp rate for the primary time sample window may be determined. The estimated fractional chirp rate may be determined as the chirp rate corresponding to a maximum for the pitch likelihood metric on the estimated pitch.

At operation 48, an envelope vector for the estimated pitch of the primary time sample window may be determined. As is described herein, the envelope vector for the predicted pitch of the primary time sample window may represent the harmonic envelope of sound represented in the audio signal at the primary time sample window having the predicted pitch.

At an operation 50, a predicted pitch for a next time sample window in the processing time window may be determined. This time sample window may include, for example, a time sample window that is adjacent to the time sample window having the estimated pitch and estimated fractional chirp rate determined at operation 48. The description of this time sample window as "next" is not intended to limit the this time sample window to an adjacent or consecutive time sample window (although this may be the case). Further, the use of the word "next" does not mean that the next time sample window comes temporally in the audio signal after the time sample window for which the estimated pitch and estimated fractional chirp rate have been determined. For example, the next time sample window may occur in the audio signal before the time sample window for which the estimated pitch and the estimated fractional chirp rate have been determined.

Determining the predicted pitch for the next time sample window may include, for example, incrementing the pitch from the estimated pitch determined at operation 48 by an amount that corresponds to the estimated fractional chirp rate determined at operation 48 and a time difference between the time sample window being addressed at operation 48 and the next time sample window. For example, this determination of a predicted pitch may be expressed mathematically for some implementations as:

$$\phi_1 = \phi_0 + \Delta t \cdot \frac{d\phi}{dt}; \tag{1}$$

where $\phi_0$ represents the estimated pitch determined at operation 48, $\phi_1$ represents the predicted pitch for the next time sample window, $\Delta t$ represents the time difference between the time sample window from operation 48 and the next time sample window, and $$\frac{d\phi}{dt}$$

represents an estimated fractional chirp rate of the fundamental frequency of the pitch (which can be determined from the estimated fractional chirp rate).

At an operation 51, an envelope vector may be determined for the next time sample window as a function of pitch within the next time sample window. The envelope vector for the next time sample at a given pitch may represent the harmonic envelope of sound represented in the audio signal during the next time sample window having the given pitch. Determination of the coordinates for the envelope vector for the given pitch may be based on the values for the intensity coefficient at harmonic frequencies of the given pitch in the next time sample window. In implementations in which the transformed audio information includes, for the next time sample window, different sets of transformed audio information corresponding to different fractional chirp rates, operation 51 may include determining the envelope vectors for the next time sample window as a function both of pitch and fractional chirp rate.

By way of illustration, turning back to FIG. 2, plot 26 includes a harmonic envelope 29 of sound in the illustrated time sample window having a pitch $\phi$. The harmonic envelope 29 may be formed by generating a spline through the values of the intensity coefficient at the harmonic frequencies for pitch $\phi$. The coordinates of the envelope vector for the time sample window corresponding to plot 26 at pitch $\phi$ (and the fractional chirp rate corresponding to plot 26, if applicable) may be designated as the values of the intensity coefficient at two or more of the harmonic frequencies. The harmonic frequencies may include two or more of the fundamental frequency through the $n^{th}$ harmonic. Although the ordering of the harmonic numbers into the coordinates may be consistent across the envelope vectors determined, this ordering may or may not be consistent with the harmonic numbers of the harmonics (e.g., ($1^{st}$ Harmonic, $2^{nd}$ Harmonic, $3^{rd}$ Harmonic)).

Referring back to FIG. 1, at an operation 52, values of a correlation metric for the next time sample window may be determined as a function of pitch. In implementations in which the transformed audio information includes, for the next time sample window, different sets of transformed audio information corresponding to different fractional chirp rates, operation 52 may include determining values of the correlation metric for the next time sample window as a function both of pitch and fractional chirp rate. The value of the correlation metric for a given pitch (and/or a given fractional chirp rate) in the next time sample window may indicate a level of correlation between the envelope vector for the given pitch in the next time sample window and the envelope vector for the estimated pitch in another time sample window. This other time sample window may be, for example, the time sample window from which information was used to determine a predicted pitch at operation 50.

Figure 6:
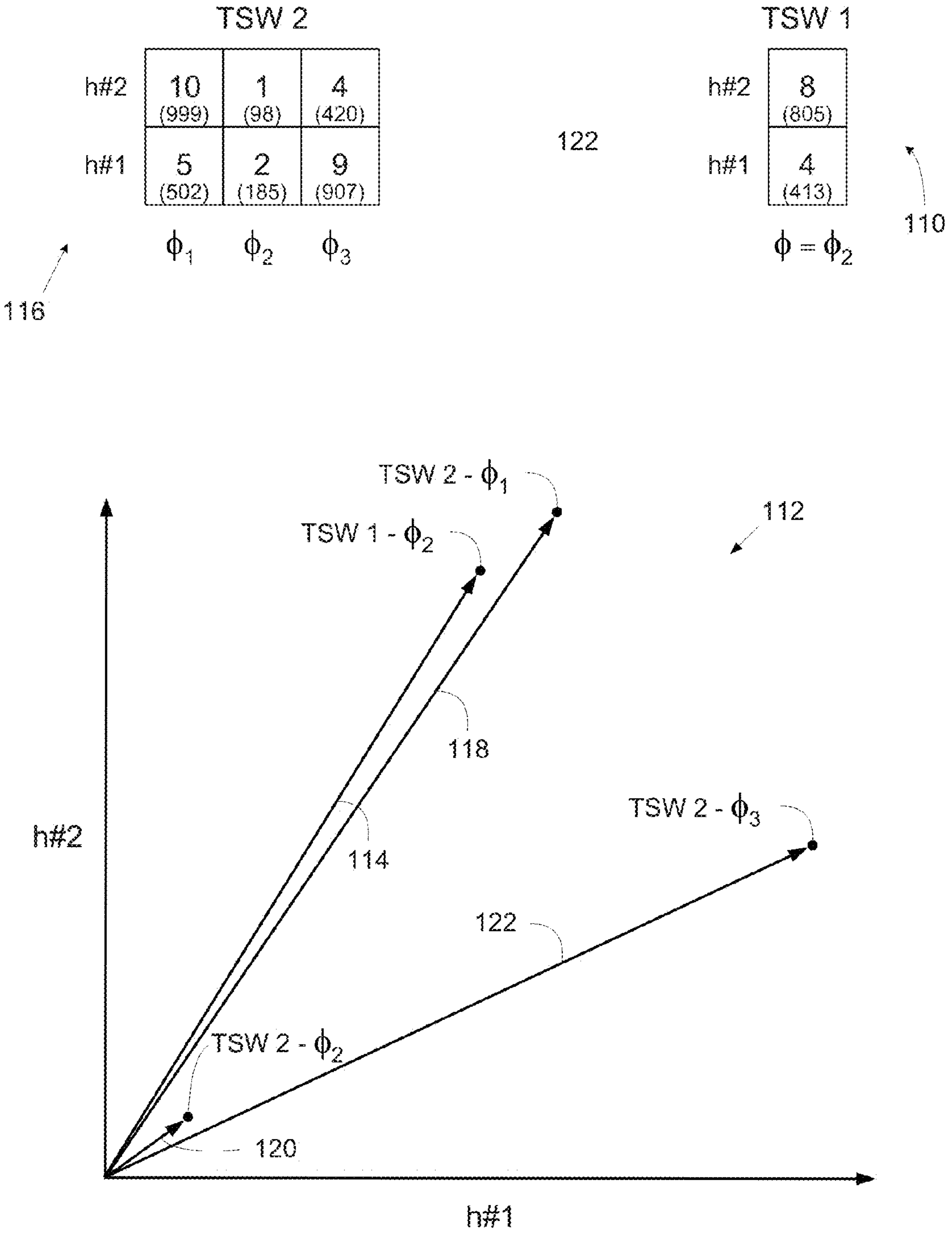
FIG. 6 illustrates a set of envelope vectors.

By way of illustration, FIG. 6 includes a table 110 that represents the values of the intensity coefficient at a first harmonic and a second harmonic of an estimated pitch $\phi_2$ for a first time sample window. In the representation provided by table 110, the intensity coefficient for the first harmonic may be 413, and the intensity coefficient for the second harmonic may be 805. The envelope vector for pitch $\phi_2$ in the first time window may be (413, 805). FIG. 6 further depicts a plot 112 of envelope vectors in a first harmonic-second harmonic space. A first envelope vector 114 may represent the envelope vector for pitch $\phi_2$ in the first time window.

FIG. 6 includes a table 116 which may represent the values of the intensity coefficient at a first harmonic and a second harmonic of several pitches ($\phi_1$, $\phi_2$, and $\phi_3$) for a second time sample window. The envelope vector for these pitches may be represented in plot 112 along with first envelope vector 114. These envelope vectors may include a second envelope vector 118 corresponding to pitch $\phi_1$ in the second time sample window, a third envelope vector 120 corresponding to pitch $\phi_2$ in the second time sample window, and a fourth envelope vector 122 corresponding to $\phi_3$ in the second time sample window.

Determination of values of a correlation metric for the second time sample window may include determining values of a metric that indicates correlation between the envelope vectors 118, 120, and 122 for the individual pitches in the second time sample window with the envelope vector 114 for the estimated pitch of the first time sample window. Such a correlation metric may include one or more of, for example, a distance metric, a dot product, a correlation coefficient, and/or other metrics that indicate correlation.

In the example provided in FIG. 6, it may be that during the second time sample window, the audio signal represents two separate harmonic sounds. One at pitch $\phi_1$ and the other at pitch $\phi_3$. Each of these pitches may be offset (in terms of pitch) from the estimated pitch $\phi_1$ in the first time sample window by the same amount. However, it may be likely that only one of these harmonic sounds is the same sound that had pitch $\phi_1$ in the first time sample window. By quantifying a correlation between the envelope vectors of the harmonic sound in the first time sample window separately for the two separate potential harmonic sounds in the second time sample window, method 10 may reduce the chances that the pitch tracking being performed will jump between sounds at the second time sample window and inadvertently begin tracking pitch for a sound different than the one that was previously being tracked. Other enhancements may be provided by this correlation.

It will be appreciated that the illustration of the envelope vectors in FIG. 6 is exemplary only and not intended to be limiting. For example, in practice, the envelope vectors may have more than two dimensions (corresponding to more harmonic frequencies), may have coordinates with negative values, may not include consecutive harmonic numbers, and/or may vary in other ways. As another example, the pitches for which envelope vectors (and the correlation metric) are determined may be greater than three. Other differences may be contemplated. It will be appreciated that the example provided by FIG. 6, envelope vectors 118, 120, and 122 may be for an individual fractional chirp rate during the second time sample window. Other envelope vectors (and corresponding correlation metrics with pitch $\phi_2$ in the first time sample window) may be determined for pitches $\phi_1$, $\phi_2$, and $\phi_3$ in the second time sample window at other fractional chirp rates.

Turning back to FIG. 1, at an operation 53, for the next time sample window, the pitch likelihood metric may be weighted. This weighting may be performed based on one or more of the predicted pitch determined at operation 50, the correlation metric determined at operation 52, and/or other weightings metrics.

In implementations in which the weighting performed at operation 53 is based on the predicted pitch determined at operation 50, the weighting may apply relatively larger weights to the pitch likelihood metric for pitches in the next time sample window at or near the predicted pitch and relatively smaller weights to the pitch likelihood metric for pitches in the next time sample window that are further away from the predicted pitch. For example, this weighting may include multiplying the pitch likelihood metric by a weighting function that varies as a function of pitch and may be centered on the predicted pitch. The width, the shape, and/or other parameters of the weighting function may be determined based on user selection (e.g., through settings and/or entry or selection), fixed, based on noise present in the audio signal, based on the range of fractional chirp rates in the sample, and/or other factors. As a non-limiting example, the weighting function may be a Gaussian function.

In implementations in which the weighting performed at operation 53 is based on the correlation metric determined at operation 52, relatively larger weights may be applied to the pitch likelihood metric at pitches having values of the correlation metric that indicate relatively high correlation with the envelope vector for the estimated pitch in the other time sample window. The weighting may apply relatively smaller weights to the pitch likelihood metric at pitches having correlation metric values in the next time sample window that indicate relatively low correlation with the envelope vector for the estimated pitch in the other time sample window.

At an operation 54, an estimated pitch for the next time sample window may be determined based on the weighted pitch likelihood metric for the next sample window. Determination of the estimated pitch for the next time sample window may include, for example, identifying a maximum in the weighted pitch likelihood metric and determining the pitch corresponding to this maximum as the estimated pitch for the next time sample window.

At operation 54, an estimated fractional chirp rate for the next time sample window may be determined. The estimated fractional chirp rate may be determined, for example, by identifying the fractional chirp rate for which the weighted pitch likelihood metric has a maximum along the estimated pitch for the time sample window.

At operation 56, a determination may be made as to whether there are further time sample windows in the processing time window for which an estimated pitch and/or an estimated fractional chirp rate are to be determined. Responsive to there being further time sample windows, method 10 may return to operations 50 and 51, and operations 50, 51, 52, 53, and/or 54 may be performed for a further time sample window. In this iteration through operations 50, 51, 52, 53, and/or 54, the further time sample window may be a time sample window that is adjacent to the next time sample window for which operations 50, 51, 52, 53, and/or 54 have just been performed. In such implementations, operations 50, 51, 52, 53, and/or 54 may be iterated over the time sample windows from the primary time sample window to the boundaries of the processing time window in one or both temporal directions. During the iteration(s) toward the boundaries of the processing time window, the estimated pitch and estimated fractional chirp rate implemented at operation 50 may be the estimated pitch and estimated fractional chirp rate determined at operation 48, or may be an estimated pitch and estimated fractional chirp rate determined at operation 50 for a time sample window adjacent to the time sample window for which operations 50, 51, 52, 53, and/or 54 are being iterated.

Responsive to a determination at operation 56 that there are no further time sample windows within the processing time window, method 10 may proceed to an operation 58. At operation 58, a determination may be made as to whether there are further processing time windows to be processed. Responsive to a determination at operation 58 that there are further processing time windows to be processed, method 10 may return to operation 47, and may iterate over operations 47, 48, 50, 51, 52, 53, 54, and/or 56 for a further processing time window. It will be appreciate that iterating over the processing time windows may be accomplished in the manner shown in FIG. 1 and described herein, is not intended to be limiting. For example, in some implementations, a single processing time window may be defined at operation 30, and the further processing time window(s) may be defined individually as method 10 reaches operation 58.

Responsive to a determination at operation 58 that there are no further processing time windows to be processed, method 10 may proceed to an operation 60. Operation 60 may be performed in implementations in which the processing time windows overlap. In such implementations, iteration of operations 47, 48, 50, 51, 52, 53, 54, and/or 56 for the processing time windows may result in multiple determinations of estimated pitch for at least some of the time sample windows. For time sample windows for which multiple determinations of estimated pitch have been made, operation 60 may include aggregating such determinations for the individual time sample windows to determine aggregated estimated pitch for individual the time sample windows.

By way of non-limiting example, determining an aggregated estimated pitch for a given time sample window may include determining a mean estimated pitch, determining a median estimated pitch, selecting an estimated pitch that was determined most often for the time sample window, and/or other aggregation techniques. At operation 60, the determination of a mean, a selection of a determined estimated pitch, and/or other aggregation techniques may be weighted. For example, the individually determined estimated pitches for the given time sample window may be weighted according to their corresponding pitch likelihood metrics. These pitch likelihood metrics may include the pitch likelihood metrics specified in the audio information obtained at operation 12, the weighted pitch likelihood metric determined for the given time sample window at operation 53, and/or other pitch likelihood metrics for the time sample window.

At an operation 62, individual time sample windows may be divided into voiced and unvoiced categories. The voiced time sample windows may be time sample windows during which the sounds represented in the audio signal are harmonic or "voiced" (e.g., spoken vowel sounds). The unvoiced time sample windows may be time sample windows during which the sounds represented in the audio signal are not harmonic or "unvoiced" (e.g., spoken consonant sounds).

In some implementations, operation 62 may be determined based on a harmonic energy ratio. The harmonic energy ratio for a given time sample window may be determined based on the transformed audio information for given time sample window. The harmonic energy ratio may be determined as the ratio of the sum of the magnitudes of the coefficient related to energy at the harmonics of the estimated pitch (or aggregated estimated pitch) in the time sample window to the sum of the magnitudes of the coefficient related to energy at the harmonics across the spectrum for the time sample window. The transformed audio information implemented in this determination may be specific to an estimated fractional chirp rate (or aggregated estimated fractional chirp rate) for the time sample window (e.g., a slice through the frequency-chirp domain along a common fractional chirp rate). The transformed audio information implemented in this determination may not be specific to a particular fractional chirp rate.

For a given time sample window if the harmonic energy ratio is above some threshold value, a determination may be made that the audio signal during the time sample window represents voiced sound. If, on the other hand, for the given time sample window the harmonic energy ratio is below the threshold value, a determination may be made that the audio signal during the time sample window represents unvoiced sound. The threshold value may be determined, for example, based on user selection (e.g., through settings and/or entry or selection), fixed, based on noise present in the audio signal, based on the fraction of time the harmonic source tends to be active (e.g. speech has pauses), and/or other factors.

In some implementations, operation 62 may be determined based on the pitch likelihood metric for estimated pitch (or aggregated estimated pitch). For example, for a given time sample window if the pitch likelihood metric is above some threshold value, a determination may be made that the audio signal during the time sample window represents voiced sound. If, on the other hand, for the given time sample window the pitch likelihood metric is below the threshold value, a determination may be made that the audio signal during the time sample window represents unvoiced sound. The threshold value may be determined, for example, based on user selection (e.g., through settings and/or entry or selection), fixed, based on noise present in the audio signal, based on the fraction of time the harmonic source tends to be active (e.g. speech has pauses), and/or other factors.

Responsive to a determination at operation 62 that the audio signal during a time sample window represents unvoiced sound, the estimated pitch (or aggregated estimated pitch) for the time sample window may be set to some predetermined value at an operation 64. For example, this value may be set to 0, or some other value. This may cause the tracking of pitch accomplished by method 10 to designate that harmonic speech may not be present or prominent in the time sample window.

Responsive to a determination at operation 62, that the audio signal during a time sample window represents voiced sound, method 10 may proceed to an operation 68.

At operation 68, a determination may be made as to whether further time sample windows should be processed by operations 62 and/or 64. Responsive to a determination that further time sample windows should be processed, method 10 may return to operation 62 for a further time sample window. Responsive to a determination that there are no further time sample windows for processing, method 10 may end.

It will be appreciated that the description above of estimating an individual pitch for the time sample windows is not intended to be limiting. In some implementations, the portion of the audio signal corresponding to one or more time sample window may represent two or more harmonic sounds. In such implementations, the principles of pitch tracking above with respect to an individual pitch may be implemented to track a plurality of pitches for simultaneous harmonic sounds without departing from the scope of this disclosure. For example, if the audio information specifies the pitch likelihood metric as a function of pitch and fractional chirp rate, then maxima for different pitches and different fractional chirp rates may indicate the presence of a plurality of harmonic sounds in the audio signal. These pitches may be tracked separately in accordance with the techniques described herein.

The operations of method 10 presented herein are intended to be illustrative. In some embodiments, method 10 may be accomplished with one or more additional operations not described, and/or without one or more of the operations discussed. Additionally, the order in which the operations of method 10 are illustrated in FIG. 1 and described herein is not intended to be limiting.

In some embodiments, method 10 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 10 in response to instructions stored electronically on an electronic storage medium. The one or more processing devices may include one or more devices configured through hardware, firmware, and/or software to be specifically designed for execution of one or more of the operations of method 10.

Figure 7:
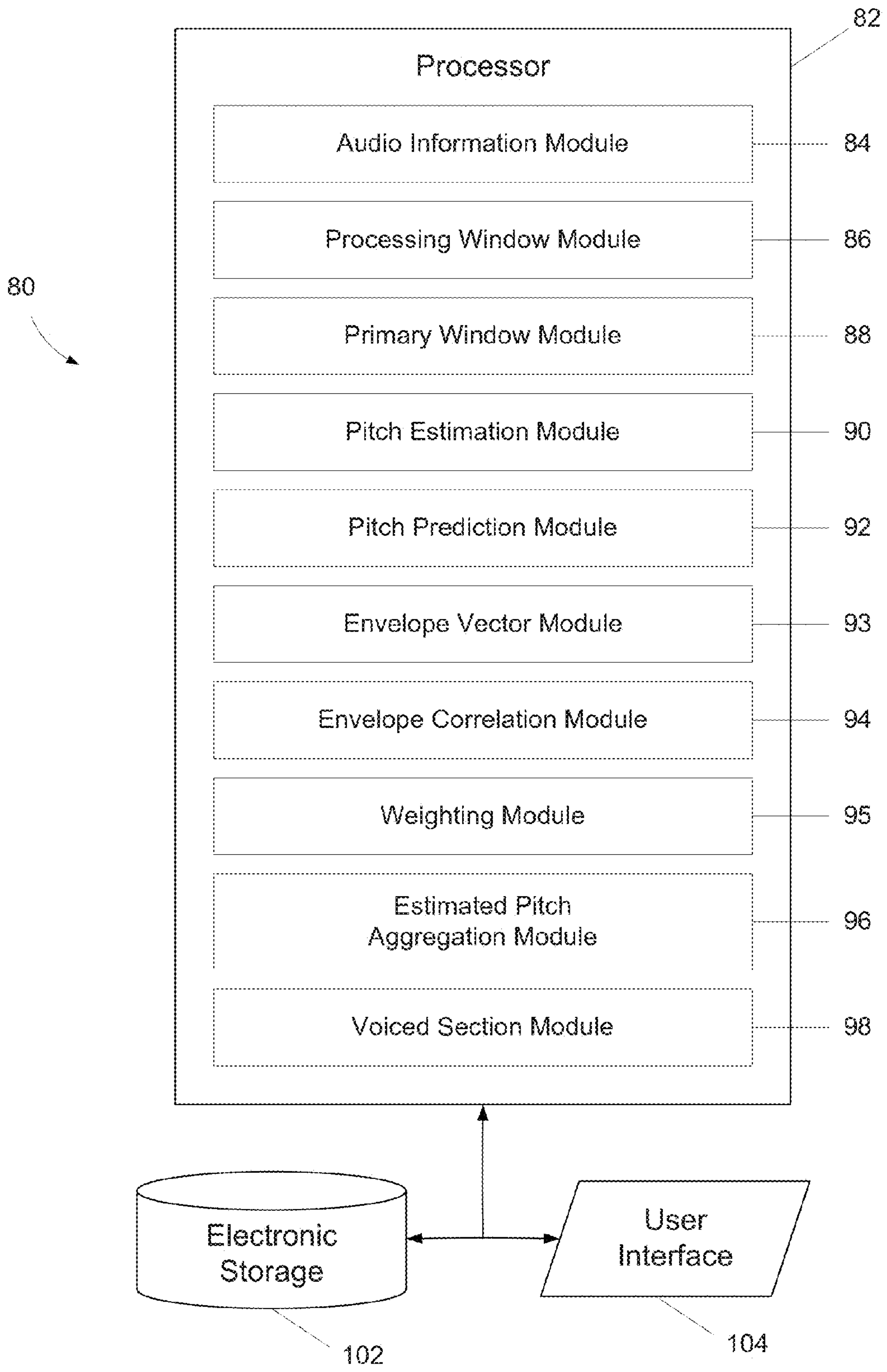
FIG. 7 illustrates a system configured to analyze audio information.

FIG. 7 illustrates a system 80 configured to analyze audio information. In some implementations, system 80 may be configured to implement some or all of the operations described above with respect to method 10 (shown in FIG. 1 and described herein). The system 80 may include one or more of one or more processors 82, electronic storage 102, a user interface 104, and/or other components.

The processor 82 may be configured to execute one or more computer program modules. The computer program modules may be configured to execute the computer program module(s) by software; hardware; firmware; some combination of software, hardware, and/or firmware; and/or other mechanisms for configuring processing capabilities on processor 82. In some implementations, the one or more computer program modules may include one or more of an audio information module 84, a processing window module 86, a peak likelihood module 88, a pitch estimation module 90, a pitch prediction module 92, an envelope vector module 93, an envelope correlation module 94, a weighting module 95, an estimated pitch aggregation module 96, a voice section module 98, and/or other modules.

The audio information module 84 may be configured to obtain audio information derived from an audio signal. Obtaining the audio information may include deriving audio information, receiving a transmission of audio information, accessing stored audio information, and/or other techniques for obtaining information. The audio information may be divided in to time sample windows. In some implementations, audio information module 84 may be configured to perform some or all of the functionality associated herein with operation 12 of method 10 (shown in FIG. 1 and described herein).

The processing window module 86 may be configured to define processing time windows across the signal duration of the audio signal. The processing time windows may be overlapping or non-overlapping. An individual processing time windows may span a plurality of time sample windows. In some implementations, processing window module 86 may perform some or all of the functionality associated herein with operation 30 of method 10 (shown in FIG. 1 and described herein).

The primary window module 88 may be configured to identify a primary time sample window. In some implementations, primary window module 88 may be configured to perform some or all of the functionality associated herein with operation 47 of method 10 (shown in FIG. 1 and described herein).

The pitch estimation module 90 may be configured to determine an estimated pitch and/or an estimated fractional chirp rate for the primary time sample window. In some implementations, pitch estimation module 90 may be configured to perform some or all of the functionality associated herein with operation 48 in method 10 (shown in FIG. 1 and described herein).

The pitch prediction module 92 may be configured to determine a predicted pitch for a first time sample window within the same processing time window as a second time sample window for which an estimated pitch and an estimated fractional chirp rate have previously been determined. The first and second time sample windows may be adjacent. Determination of the predicted pitch for the first time sample window may be made based on the estimated pitch and the estimated fractional chirp rate for the second time sample window. In some implementations, pitch prediction module 92 may be configured to perform some or all of the functionality associated herein with operation 50 of method 10 (shown in FIG. 1 and described herein).

The envelope vector module 93 may be configured to determine, as a function of pitch in the first time sample window, an envelope vector having coordinates. The envelope vector module 93 may be configured to determine the envelope vector for a given pitch in the first time sample window based on the values for the intensity coefficient at harmonic frequencies of the given pitch in the first time sample window. In some implementations, envelope vector module 93 may be configured to perform some or all of the functionality associated herein with operation 51 of method 10 (shown in FIG. 1 and described herein).

The envelope correlation module 94 may be configured to obtain an envelope vector for a sound represented by the audio signal during the second time sample window (e.g., as previously determined by envelope vector module 93). The envelope correlation module 94 may be configured to determine, for the first time sample window, values of a correlation metric as a function of pitch, wherein the value of the correlation metric for a given pitch in the first time sample window may indicate a level of correlation between the envelope vector for the second time sample window and the envelope vector for the given pitch in the first time sample window. In some implementations, envelope correlation module 94 may be configured to perform some or all of the functionality associated herein with operation 52 (shown in FIG. 1 and described herein).

The weighting module 95 may be configured determine to the pitch likelihood metric for the first time sample window based on the predicted pitch determined for the first time sample window. This weighting may be based on one or more of the predicted pitch determined by pitch prediction module 92, the values of the correlation metric determined by envelope correlation module 94, and/or other weighting parameters.

The weighting module 95 may be configured to weight the pitch likelihood metric for the first time sample window such that relatively larger weights may be applied to the pitch likelihood metric at pitches having correlation metric values in the first time sample window that indicate relatively high correlation with the envelope vector for the estimated pitch in the second time sample window. The weighting module 95 may be configured to weight the pitch likelihood metric for the first time sample window such that relatively smaller weights may be applied to the pitch likelihood metric at pitches having correlation metric values in the first time sample window that indicate relatively low correlation with the envelope vector for the estimated pitch in the second time sample window. In some implementations, weighting module 95 may be configured to perform some or all of the functionality associated herein with operation 53 in method 10 (shown in FIG. 1 and described herein).

The pitch estimation module 90 may be further configured to determine an estimated pitch and/or an estimated fractional chirp rate for the first time sample window based on the weighted pitch likelihood metric for the first time sample window. This may include identifying a maximum in the weighted pitch likelihood metric for the first time sample window. The estimated pitch and/or estimated fractional chirp rate for the first time sample window may be determined as the pitch and/or fractional chirp rate corresponding to the maximum weighted pitch likelihood metric for the first time sample window. In some implementations, pitch estimation module 90 may be configured to perform some or all of the functionality associated herein with operation 54 in method 10 (shown in FIG. 1 and described herein).

As, for example, described herein with respect to operations 47, 48, 50, 51, 52, 53, 54, and/or 56 in method 10 (shown in FIG. 1 and described herein), modules 88, 90, 92, 93, 94, 95, and/or other modules may operate to iteratively determine estimated pitch for the time sample windows across a processing time window defined by module processing window module 86. In some implementations, the operation of modules, 88, 90, 92, 93, 94, 95 and/or other modules may iterate across a plurality of processing time windows defined by processing window module 86, as was described, for example, with respect to operations 30, 47, 48, 50, 51, 52, 53, 54, 56, and/or 58 in method 10 (shown in FIG. 1 and described herein).

The estimated pitch aggregation module 96 may be configured to aggregate a plurality of estimated pitches determined for an individual time sample window. The plurality of estimated pitches may have been determined for the time sample window during analysis of a plurality of processing time windows that included the time sample window. Operation of estimated pitch aggregation module 96 may be applied to a plurality of time sample windows individually across the signal duration. In some implementations, estimated pitch aggregation module 96 may be configured to perform some or all of the functionality associated herein with operation 60 in method 10 (shown in FIG. 1 and described herein).

Processor 82 may be configured to provide information processing capabilities in system 80. As such, processor 82 may include one or more of a digital processor, an analog processor, a digital circuit designed to process information, an analog circuit designed to process information, a state machine, and/or other mechanisms for electronically processing information. Although processor 82 is shown in FIG. 7 as a single entity, this is for illustrative purposes only. In some implementations, processor 82 may include a plurality of processing units. These processing units may be physically located within the same device, or processor 82 may represent processing functionality of a plurality of devices operating in coordination (e.g., "in the cloud", and/or other virtualized processing solutions).

It should be appreciated that although modules 84, 86, 88, 90, 92, 93, 94, 95, 96, and 98 are illustrated in FIG. 7 as being co-located within a single processing unit, in implementations in which processor 82 includes multiple processing units, one or more of modules 84, 86, 88, 90, 92, 93, 94, 95, 96, and/or 98 may be located remotely from the other modules. The description of the functionality provided by the different modules 84, 86, 88, 90, 92, 93, 94, 95, 96, and/or 98 described below is for illustrative purposes, and is not intended to be limiting, as any of modules 84, 86, 88, 90, 92, 93, 94, 95, 96, and/or 98 may provide more or less functionality than is described. For example, one or more of modules 84, 86, 88, 90, 92, 93, 94, 95, 96, and/or 98 may be eliminated, and some or all of its functionality may be provided by other ones of modules 84, 86, 88, 90, 92, 93, 94, 95, 96, and/or 98. As another example, processor 82 may be configured to execute one or more additional modules that may perform some or all of the functionality attributed below to one of modules 84, 86, 88, 90, 92, 93, 94, 95, 96, and/or 98.

Electronic storage 102 may comprise electronic storage media that stores information. The electronic storage media of electronic storage 102 may include one or both of system storage that is provided integrally (i.e., substantially non-removable) with system 102 and/or removable storage that is removably connectable to system 80 via, for example, a port (e.g., a USB port, a firewire port, etc.) or a drive (e.g., a disk drive, etc.). Electronic storage 102 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 102 may include virtual storage resources, such as storage resources provided via a cloud and/or a virtual private network. Electronic storage 102 may store software algorithms, information determined by processor 82, information received via user interface 104, and/or other information that enables system 80 to function properly. Electronic storage 102 may be a separate component within system 80, or electronic storage 102 may be provided integrally with one or more other components of system 80 (e.g., processor 82).

User interface 104 may be configured to provide an interface between system 80 and users. This may enable data, results, and/or instructions and any other communicable items, collectively referred to as "information," to be communicated between the users and system 80. Examples of interface devices suitable for inclusion in user interface 104 include a keypad, buttons, switches, a keyboard, knobs, levers, a display screen, a touch screen, speakers, a microphone, an indicator light, an audible alarm, and a printer. It is to be understood that other communication techniques, either hard-wired or wireless, are also contemplated by the present invention as user interface 104. For example, the present invention contemplates that user interface 104 may be integrated with a removable storage interface provided by electronic storage 102. In this example, information may be loaded into system 80 from removable storage (e.g., a smart card, a flash drive, a removable disk, etc.) that enables the user(s) to customize the implementation of system 80. Other exemplary input devices and techniques adapted for use with system 80 as user interface 104 include, but are not limited to, an RS-232 port, RF link, an IR link, modem (telephone, cable or other). In short, any technique for communicating information with system 80 is contemplated by the present invention as user interface 104.

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system configured to track pitch in an audio signal, the system comprising:

an electronic storage storing computer program modules; and one or more processors configured to execute the computer program modules, the computer program modules being configured to:

receive the audio signal obtained from a user input device;

obtain a first transformation of the audio signal in a first time period, wherein the first transformation represents the audio signal as a function of frequency in the first time period;

obtain a first pitch corresponding to a first sound in the first time period of the audio signal;

determine a first envelope vector of the first time period from the first transformation in a multi-dimensional space, wherein each dimension of the multi-dimensional space corresponds to one of a plurality of harmonics of a pitch and the first envelope vector of the first time period is defined by a first set of coordinates corresponding to intensity coefficients at a plurality of harmonics of the first pitch in the first transformation;

obtain a second transformation of the audio signal in a second time period, wherein the second time period is different from the first time period and the second transformation represents the audio signal as a function of frequency in the second time period;

obtain a second pitch corresponding to a second sound in the second time period of the audio signal;

determine a second envelope vector of the second time period from the second transformation in the multi-dimensional space, wherein the second envelope vector of the second time period is defined by a second set of coordinates corresponding to intensity coefficients at a plurality of harmonics of the second pitch in the second transformation;

determine a first correlation between the first envelop vector of the first time period and the second envelope vector of the second time period;

obtain a third pitch corresponding to a third sound in the second time period of the audio signal;

determine a third envelope vector of the second time period from the second transformation in the multi-dimensional space, wherein the third envelope vector of the second time period is defined by a third set of coordinates corresponding to intensity coefficients at a plurality of harmonics of the third pitch in the second transformation;

determine a second correlation between the first envelop vector of the first time period and the third envelope vector of the second time period; and determine, using the first correlation and the second correlation, that the first sound in the first time period of the audio signal and the second sound in the second time period of the audio signal are portions of a same harmonic sound.

2. The system of claim 1, wherein the first and second time periods of the audio signal correspond to a first and a second time sample windows of the audio signal.

3. The system of claim 2, wherein the second time sample window is adjacent to the first window of time before or after the first time sample window.

4. The system of claim 2, wherein the second time sample window overlaps with the first time sample window.

5. The system of claim 2, the computer program modules are further configured to identify a primary time sample window as the first time sample window.

6. The system of claim 1, wherein the first transformation of the audio signal in the first time period comprises an intensity coefficient related to an intensity of the audio signal as a function of frequency and fractional chirp rate.

7. The system of claim 6, wherein to obtain the first and second pitches comprises to search for a maximum across a plurality of frequencies for one common fractional chirp rate common to both the first transformation and second transformation respectively.

8. The system of claim 1, wherein the computer program modules are further configured to obtain a fractional chirp rate associated with the first sound, wherein to obtain the second pitch comprises incrementing the first pitch by an amount that corresponds to the obtained fractional chirp rate associated with the first sound and a time difference between the first and second time periods of the audio signal.

9. A method for tracking pitch in an audio signal, the method comprising:

receiving the audio signal obtained from a user input device;

obtaining a first transformation of the audio signal in a first time period, wherein the first transformation represents the audio signal as a function of frequency in the first time period;

obtaining a first pitch corresponding to a first sound in the first time period of the audio signal;

determining a first envelope vector of the first time period from the first transformation in a multi-dimensional space, wherein each dimension of the multi-dimensional space corresponds to one of a plurality of harmonics of a pitch and the first envelope vector of the first time period is defined by a first set of coordinates corresponding to intensity coefficients at a plurality of harmonics of the first pitch in the first transformation;

obtaining a second transformation of the audio signal in a second time period, wherein the second time period is different from the first time period and the second transformation represents the audio signal as a function of frequency in the second time period;

obtaining a second pitch corresponding to a second sound in the second time period of the audio signal;

determining a second envelope vector of the second time period from the second transformation in the multi-dimensional space, wherein the second envelope vector of the second time period is defined by a second set of coordinates corresponding to intensity coefficients at a plurality of harmonics of the second pitch in the second transformation;

determining a first correlation between the first envelop vector of the first time period and the second envelope vector of the second time period;

obtaining a third pitch corresponding to a third sound in the second time period of the audio signal;

determining a third envelope vector of the second time period from the second transformation in the multi-dimensional space, wherein the third envelope vector of the second time period is defined by a third set of coordinates corresponding to intensity coefficients at a plurality of harmonics of the third pitch in the second transformation;

determining a second correlation between the first envelop vector of the first time period and the third envelope vector of the second time period; and determining, using the first correlation and the second correlation, that the first sound in the first time period of the audio signal and the second sound in the second time period of the audio signal are portions of a same harmonic sound.

10. The method of claim 9, wherein the first and second time periods of the audio signal correspond to a first and a second time sample windows of the audio signal.

11. The method of claim 10, wherein the second time sample window is adjacent to the first window of time before or after the first time sample window.

12. The method of claim 10, wherein the second time sample window overlaps with the first time sample window.

13. The method of claim 10, further comprising identifying a primary time sample window as the first time sample window.

14. The method of claim 9, wherein the first transformation of the audio signal in the first time period comprises an intensity coefficient related to an intensity of the audio signal as a function of frequency and fractional chirp rate.

15. The method of claim 14, wherein obtaining the first and second pitches comprises searching for a maximum across a plurality of frequencies for one common fractional chirp rate for the first transformation and second transformation respectively.

16. The method of claim 9, further comprising obtaining a fractional chirp rate associated with the first sound, wherein obtaining the second pitch comprises incrementing the first pitch by an amount that corresponds to the obtained fractional chirp rate associated with the first sound and a time difference between the first and second time periods of the audio signal.

17. A non-transitory computer readable storage medium having data stored therein representing computer program modules executable by a computer, the computer program modules including instructions to track pitch in an audio signal, the storage medium comprising:

instructions for receiving the audio signal obtained from a user input device;

instructions for obtaining a first transformation of the audio signal in a first time period, wherein the first transformation represents the first portion of the audio signal as a function of frequency in the first time period;

instructions for obtaining a first pitch corresponding to a first sound in the first time period of the audio signal;

instructions for determining a first envelope vector of the first time period from the first transformation in a multi-dimensional space, wherein each dimension of the multi-dimensional space corresponds to one of a plurality of harmonics of a pitch and the first envelope vector of the first time period is defined by a first set of coordinates corresponding to intensity coefficients at a plurality of harmonics of the first pitch in the first transformation;

instructions for obtaining a second transformation of the audio signal in a second time period, wherein the second time period is different from the first time period and the second transformation represents the second portion of the audio signal as a function of frequency in the second time period;

instructions for obtaining a second pitch corresponding to a second sound in the second time period of the audio signal;

instructions for determining a second envelope vector of the second time period from the second transformation in the multi-dimensional space, wherein the second envelope vector of the second time period is defined by a second set of coordinates corresponding to intensity coefficients at a plurality of harmonics of the second pitch in the second transformation;

instructions for determining a first correlation between the first envelop vector of the first time period and the second envelope vector of the second time period;

instructions for obtaining a third pitch corresponding to a third sound in the second time period of the audio signal;

instructions for determining a third envelope vector of the second time period from the second transformation in the multi-dimensional space, wherein the third envelope vector of the second time period is defined by a third set of coordinates corresponding to intensity coefficients at a plurality of harmonics of the third pitch in the second transformation;

instructions for determining a second correlation between the first envelop vector of the first time period and the third envelope vector of the second time period; and instructions for determining, using the first correlation and the second correlation, that the first sound in the first time period of the audio signal and the second sound in the second time period of the audio signal are portions of a same harmonic sound.

18. The non-transitory computer readable storage medium of claim 17, wherein the first and second time periods of the audio signal correspond to a first and a second time sample windows of the audio signal.

19. The non-transitory computer readable storage medium of claim 18, wherein the second time sample window is adjacent to the first window of time before or after the first time sample window.

20. The non-transitory computer readable storage medium of claim 18, wherein the second time sample window overlaps with the first time sample window.

21. The non-transitory computer readable storage medium of claim 18, further comprising instructions for identifying a primary time sample window as the first time sample window.

22. The non-transitory computer readable storage medium of claim 17, wherein the first transformation of the audio signal in the first time period comprises an intensity coefficient related to an intensity of the audio signal as a function of frequency and fractional chirp rate.

23. The non-transitory computer readable storage medium of claim 22, wherein instructions for obtaining the first and second pitches further comprises instructions for searching for a maximum across a plurality of frequencies for one common fractional chirp rate for the first transformation and second transformation respectively.

24. The non-transitory computer readable storage medium of claim 17, further comprising instructions for obtaining a fractional chirp rate associated with the first sound, wherein the instructions for obtaining the second pitch comprises instructions for incrementing the first pitch by an amount that corresponds to the obtained fractional chirp rate associated with the first sound and a time difference between the first and second time periods of the audio signal.

* * * * *